United States Patent [19]

Comolli

[11] 4,151,073
[45] Apr. 24, 1979

[54] PROCESS FOR PHASE SEPARATION

[75] Inventor: Alfred G. Comolli, Yardley, Pa.

[73] Assignee: Hydrocarbon Research, Inc.

[21] Appl. No.: 956,534

[22] Filed: Oct. 31, 1978

[51] Int. Cl.$^2$ ........................... C10G 9/16; C10G 1/06
[52] U.S. Cl. ................................. 208/340; 208/8 R;
   208/10; 208/11 R; 208/48 R; 208/100; 208/162
[58] Field of Search ..................... 208/48 R, 100, 162,
   208/340, 8 R, 10, 11 R

[56] References Cited

U.S. PATENT DOCUMENTS

| 3,549,517 | 12/1970 | Lehman et al. | 208/108 |
| 3,775,296 | 11/1973 | Chervenak et al. | 208/48 R |
| 4,042,487 | 8/1977 | Seguchi et al. | 208/48 R |
| 4,045,329 | 8/1977 | Johanson et al. | 208/10 |
| 4,085,034 | 4/1978 | Endo et al. | 208/48 R |

Primary Examiner—Delbert E. Gantz
Assistant Examiner—G. E. Schmitkons
Attorney, Agent, or Firm—Michael A. Jacobs

[57] ABSTRACT

This invention provides a continuous process for separating a gaseous phase from a hydrocarbon liquid containing carbonaceous particulates and gases. The liquid is fed to a cylindrical separator, with the gaseous phase being removed therefrom as an overhead product, whereas the hydrocarbon liquid and the particulates are withdrawn as a bottoms product. By feeding the liquid tangentially to the separator and maintaining a particulate-liquid slurry downward velocity of from about 0.01 to about 0.25 fps in the separator, a total solids weight percent in the slurry of from about 0.1 to about 30%, a slurry temperature of from about 550° to about 900° F., a slurry residence time in the separator of from about 30 to about 360 seconds, and a length/diameter ratio for the separator of from about 20/1 to about 50/1, so that the characterization factor, $\alpha$, defined as $$\alpha = \frac{\text{slurry residence time (sec)}}{\text{slurry downward velocity (ft/sec)}} \times \frac{\text{wt \% solids} \times \text{slurry temperature (R}^\circ\text{)}}{10^6}$$

does not exceed about 48 (°R sec$^2$)/ft, the deposit of carbonaceous materials on the interior surface of the separator may be substantially eliminated.

7 Claims, No Drawings

PROCESS FOR PHASE SEPARATION

BACKGROUND OF THE INVENTION

This invention is related to a process for separating the gaseous phase contained in a flow stream having solid, liquid, and gaseous components. More specifically, the present invention is related to the continuous separation of the gaseous phase from a hydrocarbon liquid containing carbonaceous particulates and gases.

In conventional coal liquefaction processes, a light-hydrocarbon liquid stream containing gases and fine solid particles is withdrawn from the high temperature hydrogenation reaction step. The gases are separated from the liquid, purified, and recycled to the reaction step. As to the particulate-liquid slurry, this is subjected to further processing steps.

In designing the phase separators for such gas-liquid-solid mixtures, it has been conventional to use the following equation:

$$K = \frac{U}{\left(\frac{\rho e}{\rho g} - 1\right)^{0.5}}$$

Where:
U = vapor exit velocity, ft/sec
$\rho e$ = liquid density
$\rho g$ = vapor density In order to provide a maximum gas exit velocity without entrainment of liquid droplets, K has been known to be limited to about 0.01. In addition, it is also known to place the vapor exit at a minimum distance of about 3 feet from the liquid surface to allow for vapor disengagement.

It has been found that the use of such conventional design criteria for a phase separator handling hot coal-derived liquids is undesirable, since under these conditions the fine particulates comprising unreacted coal and ash settle on the interior surface. These settled particulates, at elevated temperatures of 700°–900° F. and with a deficiency of hydrogen, result in the formation of tough coke deposits in the lower portions of the separator. These deposits cause plugging and present a severe obstacle to the efficient and economical operation of coal liquefaction and conversion processes.

It has been discovered that by varying the processing conditions under which the phase separator is operated, the problems of coking and plugging may be avoided or entirely eliminated.

SUMMARY OF THE INVENTION

According to the present invention, there is provided an improved continuous process for separating a gaseous phase from a hydrocarbon liquid containing particulates and gases and specifically containing appreciable carbonaceous particulates. The hydrocarbon liquid is fed to a cylindrical separator, with the gases being removed as an overhead product while the slurry comprising the liquid and the particulates is withdrawn as a bottoms product. It has been found that improved separator operation is achieved by feeding the liquids tangentially to the separator and by maintaining a particulate-liquid slurry downward velocity of from 0.01 to about 0.25 fps in the separator, a total solids wt % in the slurry of from about 0.1 to about 30%, a slurry temperature of from about 550° to about 900° F., a slurry residence time in the separator of from about 30 to about 360 seconds, and a length/diameter ratio for the separator of from about 20/1 to about 50/1, such that the characterization factor, $\alpha$, defined as $$\alpha = \frac{\text{slurry residence time (sec)}}{\text{slurry downward velocity (ft/sec)}} \times \frac{\text{wt \% solids} \times \text{slurry temperature (R}^\circ\text{)}}{10^6}$$

does not exceed about 48 ° R sec²/ft. By so controlling the above mentioned processing conditions, the problems with regard to coke deposition and plugging in the phase separator may be completely eliminated.

DETAILED DESCRIPTION OF THE INVENTION

The present invention is related to a continuous process of separating a gaseous phase from a flow stream containing a liquid phase, a solid phase, and a gaseous phase. More specifically, the present invention is directed to a continuous process for separating a gaseous phase from a light hydrocarbon liquid containing fine solid particulates and gases and wherein the particulates are usually between 10–80% carbonaceous type.

According to the present invention, a hydrocarbon liquid containing the particulates and gases is introduced tangentially into approximately the middle portion of a cylindrical separator. The gaseous phase is removed from the separator as an overhead product and a slurry comprising the hydrocarbon liquid and the particulates is removed as a bottoms product. The hydrocarbon liquid may be the product stream from the high temperature hydrogenation reaction step in a conventional coal liquefaction process, such a liquefaction process being exemplified in U.S. Pat. No. 4,045,329. In feeding the liquid to the separator, it is important to note that the liquid should be introduced tangentially to the separator so as to create a whirling motion in the slurry. Such whirling motion helps prevent the carbonaceous material contained in the liquid stream from depositing on the interior surface of the separator.

In addition to tangentially feeding the hydrocarbon liquid to the separator, the following conditions must also be maintained, according to the present invention.

Firstly, it is important to maintain a sufficiently high rate of slurry removal from the separator bottom so as to maintain particulate-liquid slurry downward velocity in the separator in a range between about 0.01 to about 0.25 fps. This slurry velocity range is necessary so as to prevent the settling of the particulates on the separator wall. Preferably, the slurry velocity for coal-derived liquids is from about 0.045 to about 0.20 fps. Secondly, the total solids content in the slurry exiting from the separator should be within the range of from about 0.1 to about 30%, more preferably from about 1.5 to about 25%. Concentrations of particulates of greater than 30% by weight should be avoided, since this may cause problems in withdrawing the slurry from the separator as well as increasing the probability of coke deposition and plugging of the separator. The total solids will usually comprise 10–80% carbonaceous type.

Thirdly, the slurry within the separator should be maintained at a temperature of from about 550° to about 900° F., preferably from about 600° to about 850° F. Temperatures below 550° F. should be avoided since such low temperatures may cause the condensation of molten carbonaceous material in the separator.

Fourthly, the average residence time of the slurry in the separator is within the range of from about 30 to about 360 seconds, preferably from about 60 to about 300 seconds. The above-mentioned ranges of residence time are significant in that short residence times will prevent the settling of carbonaceous materials contained in the slurry, while residence times exceeding about 360 seconds contribute to coking and plugging in the separator.

Fifthly, the length/diameter (L/D) ratio for the separator below the feed inlet should be within the range of from about 20/1 to about 50/1, preferably from about 25/1 to about 45/1. Since the residence time as well as the slurry downward velocity depend on the configuration of the separator, the dimensions for the separator should be restricted within the abovementioned ranges.

Finally, it is of utmost importance that the above-mentioned process conditions be selected so that the characterization factor, $\alpha$, defined as $$\alpha = \frac{\text{slurry residence time (sec)}}{\text{slurry downward velocity (ft/sec)}} \times \frac{\text{wt \% solids} \times \text{slurry temperature (R}^\circ\text{)}}{10^6}$$

does not exceed about 48 $^\circ$R sec$^2$/ft, and preferably is within the range of from about 2 to about 48 $^\circ$R sec$^2$/ft.

For the case wherein the hydrocarbon liquid is the product of the hydrogenation reaction step in a coal liquefaction process, the particulates contained in the hydrocarbon liquid stream subsequent to the hydrogenation step has the following particle size distribution:

| Particle Size (Microns) | % of Total |
|---|---|
| +300 | 2.1 |
| 200–300 | 1.0 |
| 150–200 | 1.1 |
| 100–150 | 2.1 |
| 75–100 | 4.6 |
| 30–75 | 1.1 |
| 20–30 | 4.0 |
| 10–20 | 10.0 |
| 5–10 | 18.0 |
| 2–5 | 31.0 |
| −2 | 25.0 |

For such a system, the wt % of total solids preferably ranges from above 1.5% to about 25% and $\alpha$ is preferably between about 2 and about 48 $^\circ$R sec$^2$/ft.

For hydrogenated petroleum oils or residuum containing coke particles and mineral particulates, i.e., sand, such as exemplified by U.S. Pat. Nos. 3,549,517 or 3,775,296, the particles size for the solids is within the range of from about 2 to 300 microns. For this kind of hydrocarbon liquid, the processing conditions in the phase separator are substantially the same as listed above, with the following exception. That is, the total solids concentration in the slurry is usually within the range of from about 0.1 to about 15 wt percent, preferably from about 0.2 to about 10 percent, of which carbonaceous solids comprise between about 10–60 wt. percent of total solids. Accordingly, for such hydrogenated oils, characterization factor $\alpha$ should be within the range of from about 1.0 to about 30.0 $^\circ$R sec$^2$/ft, preferably from about 2.0 to about 25.0 $^\circ$R sec$^2$/ft.

The present invention is further illustrated in the following examples. It must be noted that the examples are for illustrative purposes and should not be construed to be limiting.

EXAMPLE I

Test runs were made using a coal-derived liquid, which is the product stream obtained from a coal hydrogenation reactor, as the hydrocarbon liquid. The liquid was fed tangentially to a separator at about the middle portion thereof. The process conditions as well as results are summarized in Table 1.

TABLE 1

| Run No. | 1 | 2 | 3 | 4 |
|---|---|---|---|---|
| Slurry Residence Time in Separator, Sec. | 96 | 108 | 348 | 222 |
| Slurry Downward Velocity in Separator, Ft/Sec. | .047 | .041 | .013 | 0.11 |
| Slurry Temperature, $^\circ$F. | 833 | 768 | 815 | 810 |
| Solids Concentration in Separator Liquid, W % | 13.0 | 15.4 | 16.5 | 18.2 |
| Characterization Factor $\alpha$, $\frac{^\circ \text{R sec}^2}{\text{ft}}$ | 34.3 | 49.8 | 563 | 46.6 |
| Separator L/D Ratio | 34 | 34 | 34 | 34 |
| Run Duration, Hrs. | 272 | 274 | 403 | 800 |
| Condition of Separator After Run | Clean | Deposits | Deposits | Moderately Clean |

The data shown in Table 1 indicate that for coal-derived liquids when $\alpha$ exceeds about 48.0 $^\circ$R sec$^2$/ft, the particles deposit on the interior surface of the separator which will lead to plugging.

EXAMPLE II

Test runs were made using a sand-containing hydrogenated oil produced from tar sands material as the hydrocarbon liquid. A tangential feed at the middle section of the separator was also used. The process conditions and results are summarized in Table 2.

TABLE 2

| Run No. | 5 | 6 |
|---|---|---|
| Slurry Residence Time, Sec. | 66 | 120 |
| Slurry Downward Velocity, Ft/Sec. | .045 | .013 |
| Slurry Temperature, $^\circ$F. | 785 | 843 |
| Solids Concentration in Liquid, W % | 1.5 | 1.5 |
| Characterization Factor, $\alpha$ | 2.7 | 18.0 |
| Separator L/D Ratio | 34 | 34 |
| Duration of Run, Hrs. | 720 | 100 |
| Condition of Separator after Run | Clean | Clean |

From the data in Table 2, it may be observed that for hydrogenated oils, separator deposits and plugging may be avoided by using such process conditions that $\alpha$ is less than 30 and preferably between 2 and 25 $^\circ$R sec$^2$/ft.

What is claimed is:

1. In a continuous process of separating a gaseous phase from a hydrocarbon liquid containing particulates and gases comprising feeding the liquid to about the middle portion of a cylindrical separator, removing the gaseous phase from the separator as an overhead vapor product, and withdrawing from the separator as a bottoms product a slurry comprising the hydrocarbon liquid and the particulates, the improvement comprising:
   (1) feeding the liquid tangentially to the separator; and
   (2) maintaining
      (a) a particulate-liquid slurry downward velocity of from about 0.01 to about 0.25 ft/sec in the separator;

(b) a solids W % in the slurry of from about 0.1 to about 30%;
(c) a slurry temperature of from about 550° to about 900° F.;
(d) a slurry residence time in the separator of from about 30 to about 360 seconds; and
(e) a length/diameter ratio for the separator of from about 20/1 to about 50/1, so that the characterization fractor, α, defined as $$\alpha = \frac{\text{slurry residence time (sec)}}{\text{slurry downward velocity (ft/sec)}} \times \frac{\text{wt \% solids} \times \text{slurry temperature (R}^\circ)}{10^6}$$

does not exceed about 48 ° R sec²/ft.

2. The process of claim 1 wherein the hydrocarbon liquid is a coal-derived liquid, the wt % of solids is from about 1.5% to about 30%, and α is from about 2 to about 48 ° R sec²/ft.

3. The process of claim 1 wherein the hydrocarbon liquid is hydrogenated oil and the wt % of solids is from about 0.1% to about 15%.

4. The process of claim 2 wherein the slurry residence time is from about 60 to about 300 sec, the slurry downward velocity is from about 0.04 to about 0.20 ft/sec., the slurry temperature is from about 650° to about 850° F., the total wt % of solids is from about 1.5 to about 25%, the length/diameter ratio is from about 25/1 to 45/1, and α is from about 2 to about 48 ° R sec²/ft.

5. The process of claim 3 wherein the slurry residence time is from about 40 to about 300 seconds, the slurry downward velocity is from about 0.01 to about 0.20 ft/sec, the liquid temperature is from about 650° to about 850° F., the total wt % of solids is from about 0.2% to about 10%, and α is from about 2.0 to about 25.0 ° R sec²/ft.

6. The process of claim 2 wherein 40–80 wt % of the solids are carbonaceous type.

7. The process of claim 3 wherein 10–60 wt% of the solids are carbonaceous type.

* * * * *